United States Patent
Kim et al.

(10) Patent No.: US 10,124,797 B2
(45) Date of Patent: Nov. 13, 2018

(54) METHOD FOR CONTROLLING VEHICLE IN CASE OF OIL-PUMP FAILURE

(71) Applicants: HYUNDAI MOTOR COMPANY, Seoul (KR); KIA MOTORS CORPORATION, Seoul (KR)

(72) Inventors: Yong Hyun Kim, Seoul (KR); Hyun Jun Soh, Seongnam-si (KR); Jeong Won Rho, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/657,907

(22) Filed: Jul. 24, 2017

(65) Prior Publication Data

US 2018/0273023 A1 Sep. 27, 2018

(30) Foreign Application Priority Data

Mar. 22, 2017 (KR) .................... 10-2017-0036051

(51) Int. Cl.
| | |
|---|---|
| *B60W 20/00* | (2016.01) |
| *B60W 20/50* | (2016.01) |
| *B60W 30/18* | (2012.01) |
| *B60W 10/06* | (2006.01) |
| *B60W 10/08* | (2006.01) |
| *G07C 5/08* | (2006.01) |
| *F01M 1/02* | (2006.01) |
| *F16H 61/00* | (2006.01) |

(52) U.S. Cl.
CPC ............ *B60W 20/50* (2013.01); *B60W 10/06* (2013.01); *B60W 10/08* (2013.01); *B60W 30/18063* (2013.01); *F01M 1/02* (2013.01); *F16H 61/0031* (2013.01); *G07C 5/0808* (2013.01); *B60W 2510/1005* (2013.01); *B60W 2520/10* (2013.01); *B60W 2710/021* (2013.01); *B60W 2710/06* (2013.01); *B60W 2710/083* (2013.01); *F01M 2001/0215* (2013.01); *Y10S 903/93* (2013.01)

(58) Field of Classification Search
None
See application file for complete search history.

(56) References Cited

FOREIGN PATENT DOCUMENTS

| KR | 10-2011-0059694 | 6/2011 |
|---|---|---|
| KR | 10-1234642 | 2/2013 |
| KR | 10-1558753 | 10/2015 |
| KR | 10-1620181 | 5/2016 |

*Primary Examiner* — Adam D Tissot
(74) *Attorney, Agent, or Firm* — Brinks Gilson & Lione

(57) ABSTRACT

A method for controlling a vehicle in the event of an oil-pump failure may include: a first comparison step of comparing, by a controller, an actual RPM of an EOP with a first set value set in advance based on a target RPM of the EOP; a maximum EOP driving step of driving the EOP to a maximum output by the controller when a result of the comparison in the first comparison step shows that the actual RPM is smaller than or equal to the first set value; a second comparison step of comparing the actual RPM of the EOP with a second set value by the controller after the maximum EOP driving step; and a creep driving step of making the vehicle perform creep driving using a motor by the controller when a result of the comparison in the second comparison step shows that the actual RPM is larger than the second set value.

8 Claims, 2 Drawing Sheets

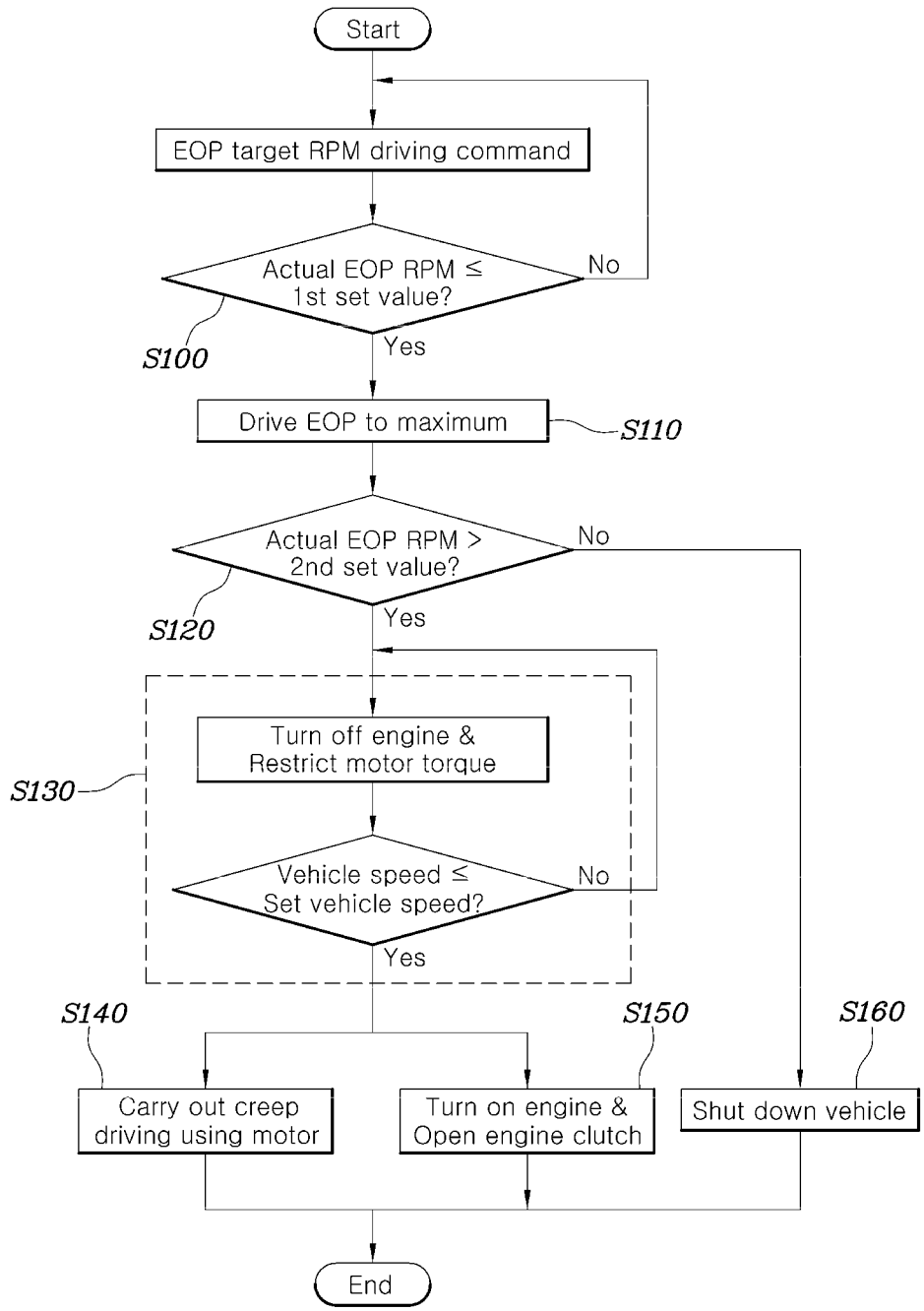

METHOD FOR CONTROLLING VEHICLE IN CASE OF OIL-PUMP FAILURE

CROSS REFERENCE TO RELATED APPLICATION

Figure 1:
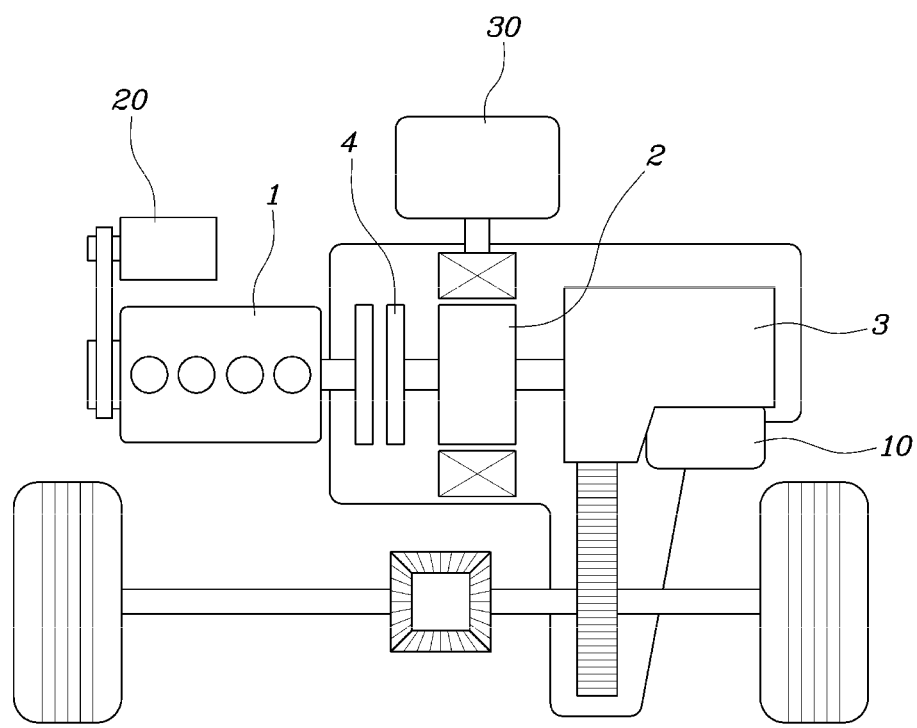

This application claims the priority of Korean Patent Application No. 10-2017-0036051, filed on Mar. 22, 2017, which is incorporated herein by reference in its entirety.

FIELD

The present disclosure relates to a vehicle control method to enable limp-home driving when there is a failure of an Oil Pump Unit (OPU) of a vehicle.

BACKGROUND

The statements in this section merely provide background information related to the present disclosure and may not constitute prior art.

In general, a hybrid vehicle uses an engine and a motor powered by a battery, as power sources thereof, and is controlled to allow the two power sources to operate in an area in which they can exhibit their individual characteristics according to driving conditions, so that the vehicle can be driven with the highest fuel efficiency.

Further, during its deceleration, the hybrid vehicle can collect an electrical energy converted from kinetic energy, which can achieve a higher fuel efficiency in comparison with a conventional gasoline-powered vehicle. Also, the hybrid vehicle can travel with its engine turned off in an urban area and can be thus used as an environment-friendly vehicle.

A hybrid vehicle is equipped with a Hybrid Control Unit (HCU), which is a high-level controller for controlling the overall operation of the vehicle, and controllers for individual devices constituting a system, and the controllers are connected through a network with the HCU, serving as the center thereof, to carry out cooperative control through information exchange therebetween.

The hybrid vehicle has an engine clutch mounted between an engine and a motor to connect the output torque of the engine, instead of a torque converter, in order to accomplish a cost reduction and minimize a loss of torque transmitted to a transmission, and is provided with an Electric Oil Pump (EOP) that supplies the hydraulic pressure in order to operate the engine clutch and the transmission.

The Electric Oil Pump (EOP) operates in conjunction with a Mechanical Oil Pump (MOP) provided in the automatic transmission to supply the hydraulic pressure necessary for the operation of the transmission, and is controlled according to interworking between the HCU and the Oil Pump Unit (OPU), which are connected with each other through the network.

For example, when the HCU provides the OPU with a target RPM of the oil pump that is determined based on the vehicle's state, a driver's demand, and information about the transmission gear position provided by a Transmission Control Unit (TCU), the OPU controls the supply of current to the electric oil pump according to the information provided by the HCU to operate the electric oil pump at the target RPM, thereby supplying the hydraulic pressure to operate the engine clutch and the transmission.

In this case, the HCU and the OPU exchange information through the network, such as the target RMP and the actual RPM of the oil pump, the operating state of the pump, whether there is an abnormality in the pump (normal or abnormal), etc.

Meanwhile, since the Mechanical Oil Pump (MOP) is operated by the driving force of the engine and the motor, the MOP acts as an element that disturbs the driving of the vehicle, which causes a decrease in fuel efficiency. Accordingly, in recent years, attempts to enhance fuel efficiency by forming hydraulic pressure using an Electric Oil Pump (EOP) only, without a Mechanical Oil Pump (MOP), have been increasing.

However, when the EOP is exclusively applied, there is no extra device capable of forming hydraulic pressure. Therefore, functions for continually measuring the performance of the OPU directly associated with the durability or function of the transmission and correctly controlling the vehicle when there is an abnormality in the OPU are required.

The description provided above as a related art of the present disclosure is only for helping understand the background of the present disclosure and should not be construed as being included in the related art known by those skilled in the art.

SUMMARY

The present disclosure provides a method for controlling a vehicle in the event of of an oil-pump failure, in which, when a failure in an OPU of the vehicle is sensed, the possibility of creep driving of the vehicle is determined based on an actual RPM of an EOP, and the creep driving is carried out using a motor to enable the vehicle to travel as far as possible, thereby enhancing driving performance and safety.

In accordance with an aspect of the present disclosure, a method for controlling a vehicle in an event of an oil-pump failure may include: a first comparison step of comparing an actual RPM of an EOP with a first set value set in advance based on a target RPM of the EOP by a controller; a maximum EOP driving step of driving the EOP to a maximum output by the controller when a result of the comparison in the first comparison step shows that the actual RPM is smaller than or equal to the first set value; a second comparison step of comparing the actual RPM of the EOP with a second set value by the controller after the maximum EOP driving step; and a creep driving step of making the vehicle perform creep driving using a motor by the controller when a result of the comparison in the second comparison step shows that the actual RPM is larger than the second set value.

The first set value may be set to a value smaller than the target RPM of the EOP.

The second set value may be set to an EOP RPM at which the vehicle can perform motor creep driving in a first gear or a second gear.

The controller may carry out the creep driving using the motor in the creep driving step only when the vehicle is in the first or second gear.

The method may further include: a torque transmission restriction step of turning off an engine until a vehicle speed reaches a set vehicle speed and restricting generation of a motor torque by the controller when the result of the comparison in the second comparison step shows that the actual RPM is larger than the second set value, wherein the controller carries out the creep driving step after the torque transmission restriction step.

The set vehicle speed may be set to a value within a vehicle speed range of a case where the vehicle is in the first or second gear.

The method may further include: a motor-charging step of charging the motor by turning on the engine and opening an engine clutch by the controller after the torque transmission restriction step.

The controller may control the vehicle to be shut down when the result of the comparison in the second comparison step shows that the actual RPM is smaller than or equal to the second set value.

According to the above-described method of controlling a vehicle in the event of an oil-pump failure, even though an abnormality in the performance of the OPU is sensed, it is possible to provide vehicle driving as far as possible by the support of vehicle performance, thereby providing driving performance and customer safety.

In addition, since the motor is charged by the engine while motor creep driving is being carried out, it is possible to reduce or prevent the main battery from being discharged.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic view of a vehicle equipped with an EOP alone according to one form of the present disclosure; and FIG. 2 is a flowchart illustrating a method for controlling a vehicle in the event of an oil pump failure according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method for controlling a vehicle in the event of an oil pump failure according to one form of the present disclosure will be described with reference to the accompanying drawings.

FIG. 1 is a schematic view of a vehicle equipped with an EOP alone according to one form of the present disclosure, and FIG. 2 is a flowchart illustrating a method for controlling a vehicle in the event of an oil pump failure according to one form of the present disclosure.

Referring to FIGS. 1 and 2, the method for controlling a vehicle when the oil pump fails may include: a first comparison step (S100) of comparing, by a controller, an actual RPM of an EOP 10 with a first set value set in advance according to a target RPM of the EOP 10; a maximum EOP driving step (S110) of driving the EOP 10 to the maximum output by the controller when a result of the comparison in the first comparison step (S100) shows that the actual RPM is smaller than or equal to the first set value; a second comparison step (S120) of comparing the actual RPM of the EOP 10 with a second set value by the controller after the maximum EOP driving step (S110); and a creep driving step (S140) of creep-driving the vehicle, using a motor 2, by the controller when a result of the comparison in the second comparison step (S120) shows that the actual EOP RPM is larger than the second set value.

Namely, when the vehicle is driven according to a driver's operation, the controller carries out control to pump oil for cooling and lubrication into vehicle components, such as an engine, a transmission, etc., by outputting, to an Oil Pump Unit (OPU), an instruction signal to drive the Electric Oil Pump (EOP) at the target RPM, as illustrated in FIG. 2, where the controller may be a Transmission Control Unit (TCU).

In particular, since the EOP 10 is arranged in the hybrid vehicle of the present disclosure to be exclusively applied thereto, the vehicle has no means for helping formation of hydraulic pressure thereof, and it is thus very important to sense an abnormality in the performance of the EOP 10.

Accordingly, in order to diagnose a failure in the EOP 10, the controller primarily determines whether the actual RPM of the EOP 10 is smaller than or equal to the first set value (step S100), where the first set value varies depending on the target RPM of the EOP 10.

Specifically, the first set value may be set to a value smaller than the target RPM of the EOP 10. For example, assuming that the first set value is set to a value corresponding to 50% of the target RPM, the first set value may be set to 750 RPM when the target RPM is equal to 1500 RPM. However, this is only one form for ease of understanding, and the ratio of the first set value to the target RPM is not to be limited to any specific value, since the ratio can be variably set by a designer.

In detail, the controller may recognize a failure in the EOP 10 by sensing a situation in which the actual RPM fails to follow the target RPM due to a failure in the EOP 10, when the controller instructs the EOP 10 to operate at the target RPM, which is target performance.

If the result of the comparison in the first comparison step (S100) shows that the actual RPM is smaller than or equal to the first set value, the controller determines that there is a failure in the EOP 10 and drives the EOP 10 to the maximum output (step S110), and then compares the actual RPM of the EOP 10 with the second set value (step S120), in order to check whether the EOP 10 can provide hydraulic pressure enough to carry out creep driving.

Here, the second set value may be set to an EOP RPM at which the vehicle can perform motor creep driving in first or second gear.

Namely, the controller may check whether the maximum RPM of the EOP 10 can form a hydraulic pressure sufficient for the vehicle driven in first or second gear, and thus can inhibit or prevent the transmission from being shut down due to insufficient hydraulic pressure in a limp-home driving mode, in which motor creep driving is carried out in first or second gear.

Accordingly, when the result of the comparison in the second comparison step (S120) shows that the actual RPM is smaller than or equal to the second set value, the controller may control the vehicle to be shut down.

If the result of the comparison in second comparison step (S120) shows that the actual RPM exceeds the second set value, the controller may make the vehicle creep driving using the motor 2 (step S140).

Namely, when the EOP 10 does not sufficiently exhibit its performance due to failure thereof, the present disclosure is provided to: identify a maximum implementable RPM of the EOP 10; determine whether the vehicle can perform motor creep driving in first or second gear at the maximum implementable RPM of the EOP 10; and make the vehicle carry out the motor creep driving if the motor creep driving is possible.

Accordingly, the present disclosure can prolong or prevent the vehicle from being shut down, entailing the risk of a secondary accident, while travelling and improve a driver's driving performance and the safety of the vehicle through limp-home driving.

In this case, the controller may carry out creep driving using the motor 2 in a creep driving step (S140) only when the vehicle is in a first or second gear.

In general, when the vehicle is running in a higher gear than a first or second gear, the transmission or the engine needs a large amount of oil. Accordingly, if the vehicle is driven in a high gear in the state in which the performance of the EOP 10 is deteriorated, the transmission is more likely to be overheated or shut down. Therefore, the creep driving using the motor 2 may be carried out only in a first or second gear.

The present disclosure may further include a torque transmission restriction step (S130) of turning off the engine until the vehicle speed reaches a set vehicle speed and restricting the generation of a motor torque by the controller when the result of the comparison in the second comparison step (S120) shows that the actual RPM is larger than the second set value, and the controller may carry out a creep driving step (S140) after the torque transmission restriction step (S130).

Namely, when it is determined in the second comparison step (S120) that the EOP 10 is ineffective for normal vehicle driving but is available for motor creep driving, the controller requests a signal from a Hybrid Control Unit (HCU), which is a high-level controller, in order to turn off the engine and restrict the generation of motor torque to inhibit or prevent a torque from being transmitted to the input terminal of the transmission. This is because the transmission is likely to break down if an attempt to change the speed of the vehicle is made in the state in which torque is transmitted to the transmission despite a deficiency in the performance of the EOP 10.

Accordingly, the controller may prolong or prevent the transmission 3 from being shut down due to motor creep driving by turning off the engine and restricting the generation of motor torque before carrying out the motor creep driving.

Particularly, the set vehicle speed may be set to a value within a vehicle speed range of the case where the vehicle is in a first or second gear.

Namely, the controller may perform control to carry out motor creep driving after restricting torque transmission to the input shaft of the transmission 3 up to the vehicle speed at the time of shifting into a first or second gear, and thus can prolong or prevent the transmission 3 from being shut down due to excessive motor torque transmission in the state in which the performance of the EOP 10 is degraded.

The present disclosure may further include a motor-charging step (S150) of charging the motor 2 by turning on the engine 1 and opening the engine clutch 4 by the controller after the torque transmission restriction step (S130).

In the present disclosure, a hybrid vehicle may be a Transmission Mounted Electric Device (TMED) type vehicle in which the motor 2 and the transmission 3 are connected together and the engine 1 is connected with the motor 2 and the transmission 3 through the engine clutch 4, as illustrated in FIG. 1.

Accordingly, when creep driving using the motor 2 is carried out, the controller may turn on the engine 1 and open the engine clutch 4 to charge a main battery 30 through a Hybrid Start Generator (HSG) 20, thereby reducing or preventing the main battery 30 driving the motor 3 from being discharged.

According to the above-described method of controlling a vehicle in the event of an oil-pump failure, even when an abnormality in the OPU performance is sensed, it is possible to provide vehicle driving as far as possible by the support of the vehicle performance, thereby providing driving performance and customer safety.

In addition, since the motor is charged by the engine while the motor creep driving is being carried out, it is possible to reduce or prevent the main battery from being discharged.

Although the present disclosure has been described and illustrated with reference to the particular forms thereof, it will be apparent to those skilled in the art that various improvements and modifications of the present disclosure can be made without departing from the technical idea of the present disclosure.

What is claimed is:

1. A method for controlling a vehicle in an event of an oil-pump failure, the method comprising:
   a first comparison step of comparing an actual RPM of an electric oil pump (EOP) with a first set value set in advance based on a target RPM of the EOP by a controller;
   a maximum EOP driving step of driving the EOP to a maximum output by the controller when a result of the comparison in the first comparison step shows that the actual RPM is smaller than or equal to the first set value;
   a second comparison step of comparing the actual RPM of the EOP with a second set value by the controller after the maximum EOP driving step; and
   a creep driving step of making the vehicle perform creep driving using a motor by the controller when a result of the comparison in the second comparison step shows that the actual RPM is larger than the second set value.

2. The method of claim 1, wherein the first set value is set to a value smaller than the target RPM of the EOP.

3. The method of claim 1, wherein the second set value is set to an EOP RPM at which the vehicle performs a motor creep driving in a first gear or a second gear.

4. The method of claim 1, wherein the controller is configured to carry out the creep driving using the motor in the creep driving step only when the vehicle is in a first gear or a second gear.

5. The method of claim 1, further comprising:
   a torque transmission restriction step of: turning off an engine until a vehicle speed reaches a set vehicle speed and restricting generation of a motor torque by the controller when the result of the comparison in the second comparison step shows that the actual RPM is larger than the second set value,
   wherein the controller is configured to carry out the creep driving step after the torque transmission restriction step.

6. The method of claim 5, wherein the set vehicle speed is set to a value within a vehicle speed range of a case where the vehicle is in a first gear or a second gear.

7. The method of claim 5, further comprising:
a motor-charging step of charging the motor by turning on the engine and opening an engine clutch by the controller after the torque transmission restriction step.

8. The method of claim 1, wherein the controller is configured to control the vehicle to be shut down when the result of the comparison in the second comparison step shows that the actual RPM is smaller than or equal to the second set value.

\* \* \* \* \*